United States Patent
Wiens et al.

(10) Patent No.: US 10,040,158 B2
(45) Date of Patent: Aug. 7, 2018

(54) HONING TOOL AS WELL AS DEVICE AND METHOD FOR DRESSING HONING STONES

(71) Applicant: Gehring Technologies GmbH, Ostfildern (DE)

(72) Inventors: Andreas Wiens, Bietigheim-Bissingen (DE); Andreas Wagner, Esslingen (DE); Gerhard Flores, Ostfildern (DE); Manuel Waiblinger, Stuttgart (DE)

(73) Assignee: Gehring Technologies GmbH, Ostfildern (DE)

( * ) Notice: Subject to any disclaimer, the term of this patent is extended or adjusted under 35 U.S.C. 154(b) by 103 days.

(21) Appl. No.: 14/619,259

(22) Filed: Feb. 11, 2015

(65) Prior Publication Data

US 2015/0231752 A1    Aug. 20, 2015

(30) Foreign Application Priority Data

Feb. 14, 2014 (DE) .................. 10 2014 202 772

(51) Int. Cl.
*B24B 1/00* (2006.01)
*B23D 77/02* (2006.01)

(52) U.S. Cl.
CPC ............ *B24B 1/00* (2013.01); *B23D 77/02* (2013.01)

(58) Field of Classification Search
CPC ........... B24B 1/00; B24B 33/02; B23D 77/02
USPC .............. 451/56, 443, 444, 72, 61, 27, 483, 451/472–473, 470, 463–464, 332
See application file for complete search history.

(56) References Cited

U.S. PATENT DOCUMENTS

| | | | | |
|---|---|---|---|---|
| 1,426,147 A | * | 8/1922 | Bugbee | G02C 7/02 351/159.52 |
| 1,499,556 A | * | 7/1924 | Sargent | B24B 33/08 451/474 |
| 1,858,869 A | * | 5/1932 | White | B24B 3/12 451/147 |
| 4,655,007 A | * | 4/1987 | Graft | B24B 33/08 451/478 |
| 5,050,352 A | * | 9/1991 | Estabrook | B24B 33/086 451/463 |
| 2010/0197199 A1 | | 8/2010 | Flores et al. | |
| 2010/0240284 A1 | * | 9/2010 | Lin | B24B 33/02 451/51 |

FOREIGN PATENT DOCUMENTS

JP    2006-231460 A    9/2006

OTHER PUBLICATIONS

Flores G.: Grundlagen and Anwendungen des Honens, Vulkan-Verlag, Essen, Germany (1992), pp. 82-84.

* cited by examiner

*Primary Examiner* — Robert Rose
(74) *Attorney, Agent, or Firm* — Gudrun E. Huckett (57) ABSTRACT

A dressing device for dressing honing stones is provided with a base body and a mounting device for mounting the dressing device in a grinding machine. The base body has at least one honing stone receptacle that is a pocket. Honing stones are inserted and secured in the honing stone receptacles and the abrasive coating of the honing stones are ground by the grinding machine. A set of honing stones that is required for furnishing a honing tool can be dressed by one mounting action in the dressing device and can be inserted into the honing tool so as to be positioned exactly at the same radial position without requiring additional machining.

17 Claims, 7 Drawing Sheets

HONING TOOL AS WELL AS DEVICE AND METHOD FOR DRESSING HONING STONES

BACKGROUND OF THE INVENTION

The invention concerns devices and methods for changing abrasives for honing as well as a correspondingly designed honing tool. In particular, the invention concerns exchange of short honing stones that provide only a reduced quantity of honed product per service life. The smaller the number of honed products per service life (short service life), the more frequently the honing stones must be exchanged; all the more important are short tool changeover times in this context. In this context, the invention may be used for conventional honing tools for cylindrical bores as well as for honing tools for non-cylindrical bores in the context of form honing.

In the honing operation used up to now, tools with short honing stones that are preferably used for form honing but also conventional honing tools with comparatively longer honing stones are regenerated and prepared for further use in a complex regenerating process. In this context, first the diamond honing stones, with or without steel blank, are soldered or glued onto a support strip and then mounted again in the same tool body.

The thus prepared honing tool serves as a grinding device for the subsequent cylindrical grinding process of the honing stones. During cylindrical grinding, the honing stones are straightened in longitudinal direction and the required radius of curvature that corresponds to the radius of the bore to be honed is reground. Subsequently, demounting of the honing stones is required in order to roughen them at the work surface that has been dressed by cylindrical grinding. Roughening means that bonding is to be recessed so that raised abrasive crystals are made available.

In any case, the original tool is however required in order to regrind/dress the honing stones. This process is described in G. Flores, Grundlagen and Anwendungen des Honens (translation: Principles and Applications of Honing), Vulkan Verlag, Essen, Germany, 1992, pages 82ff.

In addition to a great process-technological expenditure, this procedure of conventional regenerating of honing tools requires a relatively great number of constructively identical and expensive sister tools. Only then it can be ensured that at least one finish-regenerated tool is always available in order to enable a quick tool exchange with minimal downtime of the honing machine.

It is the object of the invention to simplify processing (regenerating) of honing tools and to greatly reduce the number of honing tools required for a honing spindle. These demands apply mainly to form honing because here, as a result of the special honing process, the honing stones are very short, the abrasive volume is minimal, and the service life or number of honed products are thus significantly lower in comparison to conventional honing of cylinder bores.

SUMMARY OF THE INVENTION

This object is solved according to the invention by a method for processing a honing tool, a device for dressing honing stones, and a honing tool according to the invention whose support strips can be individually adjusted.

In this way, it is possible to circulate only a few cost-intensive honing tools because the honing tools that are ready-made according to the method of the invention can be produced and stocked and, as needed, can be placed into any specimen of constructively identical honing tools of the same make onto any support strip or into any slot of the honing tool. This results in a significant reduction of the capital demand, and labor time for processing (regenerating) the honing tools is reduced.

The object of the present invention is further solved by a dressing device for dressing honing stones with a base body and means for mounting the dressing device in a grinding machine, wherein at least one honing stone receptacle is formed in the base body.

Preferably, in the base body several honing stone receptacles are formed so that a set of honing stones that is required for furnishing a honing tool can be dressed by one mounting action in the dressing device according to the invention. It is also possible to dress more than one set of honing stones in one mounting action in the dressing device according to the invention.

This device for dressing is much less costly than a honing tool so that by use of the dressing device according to the invention the number of honing tools in circulation can be significantly reduced and, as a result of this, significant cost reductions can be achieved. It is in general ideally sufficient when on one honing spindle one honing tool is in use and in parallel a second honing tool is being furnished with new honing stones. Processing of the honing stones in the dressing device according to the invention for dressing can be realized independently and is also not coupled to the production process of the honing spindle. In other words, by means of the dressing device according to the invention, the honing stones can be produced and stocked and can then be inserted as a set into a honing tool, when needed.

It has been found to be advantageous to configure the honing stone receptacles as pockets produced, for example, by milling in the base body. These pockets can be produced with very high precision. Also, it is possible to configure the pockets in accordance with the corresponding pockets of the honing tool with regard to their geometry and clamping action of the honing stones so that the honing stones during dressing in the dressing device according to the invention are positioned and secured in the same ways as later on in the honing tool. In this way, imprecisions that result upon changeover of the honing stones from the dressing device according to the invention to the honing tool are reduced so much that they have no significant negative effect on the honing operation.

It has been found to be advantageous when the base body has a central bore, the means for mounting the dressing device are designed as a mandrel, and the base body with its central bore is arranged without play on the mandrel. Such a mandrel can be produced, for example, of hardened steel and can be provided at its end faces with centering bores. With these centering bores, the mandrel can be clamped between the centers in a cylindrical grinding machine and its outer diameter (i.e., its outer wall) can be coaxially ground relative to the centering bores. When the base body of the dressing device according to the invention is mounted without play on this mandrel of very precise true-running properties, then it is ensured that the pockets of the dressing device will also have good true-running action.

As an alternative to outer cylindrical grinding, the mandrel can also be provided, mounted between the centers, with flat sections on a surface-grinding machine, wherein the flat sections later on serve as a stop for the honing stones inserted into the pockets of the dressing device.

Moreover, it is conceivable that the honing stones upon dressing are not provided with a radius at the abrasive coating. This can be, for example, the case for form honing, a method in which as a result of a minimal total honing stone surface a higher honing stone wear or faster running-in is conventional. It would be possible in this context to have working surfaces of the honing stones that are not ground on a curved, but on a flat dressing device only to the same level by flat grinding. Optionally, the edges of the honing stones are smoothed or rounded. Grinding to the same height level is possible from the side of the working surface of the abrasive coating as well as from the side of the steel blank (if present). The adaptation of the planar working surface of the honing stones to the radius of curvature of the bore is realized already after a very short processing time or after a few workpieces have been honed.

It is particularly advantageous when the pockets in radial direction are recessed to such a depth in the base body that they reach the central bore and thus also the ground outer diameter (outer wall) of the mandrel. In this case, tolerances of less than $1/100$ mm concerning the depth of the pockets can be realized without problems and, accordingly, all commonly dressed honing stones can be dressed to the same height.

In order to prevent the honing stones from falling out of the dressing device during the dressing process, means for clamping the honing stones in the pockets of the dressing device are provided. In this context it is often sufficient and good when the means for clamping are designed as clamping screws which are approximately tangentially oriented. Of course, also other clamping devices such as wedges or holding-down devices or brackets can be used. These alternatives are however usually more complex in regard to manufacture and require more mounting space.

It is also advantageous in this context when the attachment of the honing stones in the pockets of the dressing device according to the invention is realized similarly or identically as the future attachment of the honing stones in the honing tool because then during the dressing process the same clamping conditions are present.

The aforementioned object is also solved by a honing tool comprising a honing tool body, at least one honing stone, and at least one feeding means, wherein a feeding movement of each feeding means is transmitted onto a honing stone such that the honing stone is fed radially toward the bore surface that is to be processed, wherein means for separate adjustment of at least one honing stone are provided between the feeding means and the honing stones.

This honing tool differs from the honing tools disclosed in the prior art in that between the feeding means and the honing stones means for separate adjustment of the at least one honing stone are provided. In this way, it is possible to compensate the feeding means and all tolerances that occur in the kinematic chain downstream of the feeding means up to the support strips so that, despite of the manufacture-related tolerances, the radial position of all support strips of a honing tool are identical.

This means that any one of the honing stones that have been dressed with the dressing device according to the invention can be attached to the support strips of a honing tool and all honing stones are then already adjusted to the same outer diameter. In practice, this means that the abrasive surface of the honing stones can be reproducibly produced with a precision of less than $2/100$ mm, preferably with a precision of less than $1/100$ mm.

The means for separate adjustment may comprise an adjusting screw or a threaded pin and optionally a lock nut.

In this context, it is possible that the adjusting screw or the threaded pin is arranged between the push rod and the feed rod or between the feed rod and the support strip.

It is also possible to integrate the adjusting screw or the threaded pin into the support strip. In this case, the support strip has a certain flexibility in radial direction and, by means of the adjusting screw, can be spread apart or contracted within a relatively limited adjusting range of, for example, 1 mm in radial direction.

Which one of the aforementioned adjusting means is to be used depends on the boundary conditions of the individual case. The claimed invention is not necessarily limited to these adjusting means mentioned here in exemplary fashion but also other possibilities enabling the equalization of manufacturing-related tolerances are possible.

For example, an adjusting plate may be arranged between the push rod and the feed rod. It is also possible to measure the support strip after completion of assembly with regard to their radial position and to then demount each support strip individually and to remove by grinding on a surface-grinding machine or by other means so much material from the support strips that after all support strips have been mounted again their support surface for the honing stones have exactly the same size in radial direction. In this way, precisions of less than $2/100$ mm in radial direction and, in many cases, even of less than $1/100$ mm, can also be achieved. In this case, the adjusting means can be omitted without need for any substitutions.

The aforementioned object is also solved by a method for dressing at least one honing stone by using a dressing device according to the invention as described above. The method comprises the following steps:

insertion and fixation of the at least one honing stone in a receptacle (pocket) of the dressing device, and dressing of the abrasive coating of the at least one honing stone by grinding, preferably by outer cylindrical grinding.

In this way, it is possible in a simple and process-reliable way to dress a set of honing stones, respectively, such that their abrasive surfaces are exactly at the same radial outer position or the honing stones have exactly the same height so that, when any honing stone of this set of honing stones is mounted on the support strip of the honing tool according to the invention at any position, all abrasive surfaces of all honing stones of this tool have the same radial position, without further adjustment, and this tool can therefore be immediately used in production.

The proposed concept (device for dressing and method) requires generally only two honing tools: one honing tool is producing in the honing machine while into the other one the honing stones are inserted that have been conditioned/dressed according to the invention.

It is even possible that ready-to-use honing stones that have been conditioned according to the method of the invention are delivered to the customer and, within a few minutes, can be inserted into the existing tool so that the tool within a very short amount of time is again ready for production. Since in particular in form honing the tool costs are higher than in conventional honing, this concept is perfect for keeping at a minimum the investment into a plurality of constructively identical and expensive honing tools.

It is recommended to dress in one mounting action in the dressing device according to the invention at least as many honing stones as there are support strips provided on the honing tool in which the dressed honing stones are to be used. It is then possible to always produce with one dressing process a set of honing stones and the set of these honing stones can then be inserted, when needed, on a honing tool according to the invention.

Advantageously, the abrasive surfaces of the honing stones after dressing are roughened so that the honing stones immediately with the beginning of the honing process achieve a good removal performance.

Further advantages and advantageous embodiments of the invention can be taken from the following drawing and its description.

DESCRIPTION OF THE PREFERRED EMBODIMENTS

Figure 1:
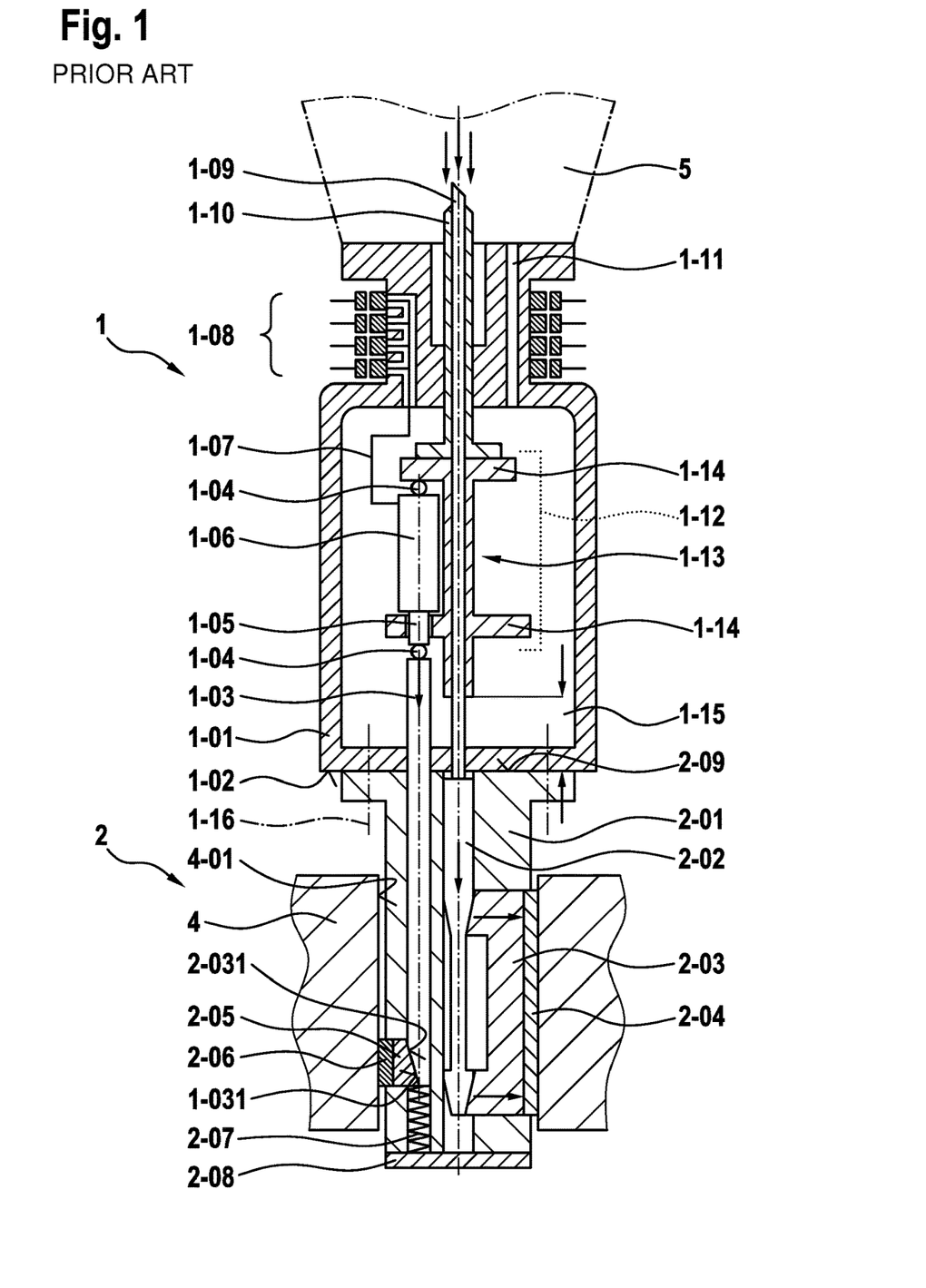
FIG. 1 is a section view of a honing machine according to the prior art for form honing.

FIG. 1 shows in an exemplary fashion a tool receiving unit 1 as a part of a honing machine for performing a feeding action as disclosed in US 2010/0197199 A1. It comprises an axis-parallel directly acting linear drive 1-06. The tool unit 2 is arranged exchangeably therein and this tool unit 2 represents the actual machining (honing) tool. It comprises in the illustrated embodiment the honing stone 2-05 that is provided with a coating of abrasive 2-06, the support strip or support strips 2-04 (radially oppositely illustrated) for supporting the honing stone or the honing stones, as well as the correlated feed rod 1-03 (for the honing stone) and 2-02 (for the guide bar).

The tool unit 2 can be exchanged in a simple and uncomplicated way without also having to exchange the tool receiving unit 1, in which several linear drives 1-06 are arranged; when using an expensive piezoelectric linear feed element, this translates into a significant cost reduction. Details in regard to this honing tool mentioned as an example can be found in US 2010/0197199 A1; the disclosure of US 2010/0197199 A1 is incorporated herein by reference in its entirety.

For the present invention, it is important that several honing stones 2-05 are provided distributed about the circumference (not visible in FIG. 1). This has the result that, because of manufacturing tolerances, the machining diameter of the different honing stones 2-05 can be different upon exchange of the honing stones 2-05 and cause unacceptable machining results.

The tool receptacle unit 1 and the tool unit 2 are contacting each other with their end faces 1-02 and 2-09 and are easily detachable from each other. The means 1-16 for doing this are well known in the art and are therefore only schematically indicated here.

The tool receiving unit 1 is disposed in the housing 1-01 that is connected with its upper end with the machine spindle 5. As is conventional for honing, rotational movement, lifting movement, and feeding movement are introduced to the tool receiving unit 1 by the honing machine. The feeding movement is realized in a two-fold mode by the feed rod 1-09 for the guide rod 2-04 and the feed rod 1-10 for the coarse adjustment of the honing stone 2-05. The feed rod 1-09 is guided within the feed tube 1-10. The feed tube 1-10 is connected to the support 1-13. Both are displaced independent of each other axially in downward direction for feeding.

The lower end of the feed tube 1-10 is connected with the upper flange 1-14 of a support 1-13. On the lower flange 1-14 of the support 1-13, the linear drive 1-06 that is acting in axial direction and serves for fine adjustment is arranged. It is supported between the upper and lower flanges 1-14 and actuates, as an actuator, the push rod 1-05. The linear drive 1-06 is supplied by the electrical lines 1-07 with drive power and control signals. The supply is realized by the slip rings 1-08. Contactless inductive transmission systems are conceivable also. The linear direct drive 1-06 operates e.g. piezoelectrically with a stroke of up to 200 μm.

The means for fine adjustment, generally referenced by 1-12, are formed by at least one linear drive 1-06 (as shown). However, about the axis of the system, further linear drives between the upper and lower flanges 1-14 can be arranged so that each honing stone has correlated therewith a separate linear drive.

The linear drive 1-06 is provided at its lower end with push rod 1-05 as an actuator. Its linear movement is transmitted onto the feed rod 1-03. In this way, the fine adjustment effected by the linear drive 1-06 is superimposed onto the coarse adjustment that is imparted by the honing machine via the feed rod 1-10.

As mentioned before, the tool unit 2, here a form honing tool, is attached with its contacting end face 2-09 to the end face 1-02 of the housing 1-01.

In the tool body 2-01, the feed rod 2-02 provided with two conical feeding surfaces is arranged and the feed rod 1-09 is acting from above onto it. The conical feeding surfaces interact with wedge-shaped feeding surfaces on the support strips 2-03 on which, immediately radially adjacent, a guide bar 2-04 is arranged so that, in this way, the axial movement of the feed rod 1-09 is converted into a radial movement of the guide bar.

In accordance with the arrangement of the linear drive or the linear drives 1-06 in the tool receptacle unit 1, the feed rod or feed rods 1-03 are arranged coaxially as a straight extension. At the end of the feed rod 1-03 there is the wedge-shaped feeding surface 1-031. The honing stone 2-05 with feeding surface 2-31 that is also wedge-shaped is resting on this feeding surface 1-031. The abrasive coating 2-06 is applied immediately on the exterior side of the honing stone 2-05. Depending on the control action of the linear drive 1-06, a fine adjustment is thus transmitted onto the honing stone 2-05 in additional to the coarse adjustment effected by the feed tube 1-10. Both feeding movements are effective in superposition at the feed rod 1-03 and are converted in the tool unit 2 into a radial feed movement of the abrasive coating 2-06 against the bore surface 4-01 of the workpiece 4. The restoring spring 2-07 supports the force transmission 1-04 that is free of play and of transverse forces between the linear drive 1-06 and the feed rod 1-03 upon relief of the feed train.

The feed rod 1-09 is moved by the honing machine axially in downward direction. It impinges on the feed rod 2-02 by means of which the guide bars 2-04 are pushed against the bore surface 4-01. On the other hand, the feed tube 1-10 moves the support 1-13 with the means for fine adjustment by means of the feed rods 1-03 axially in downward direction and forces thus the abrasive coating 2-06 of the honing stones against the bore surface 4-01 of the workpiece 4. From this position, the linear drive 1-06 is controlled along the circumference of the bore, i.e., as a function of the angle dphi, and as a function of the vertical position of the bore. In this context, each one of the honing stones in any position is correlated with a form change to be achieved at this location.

Figure 2:
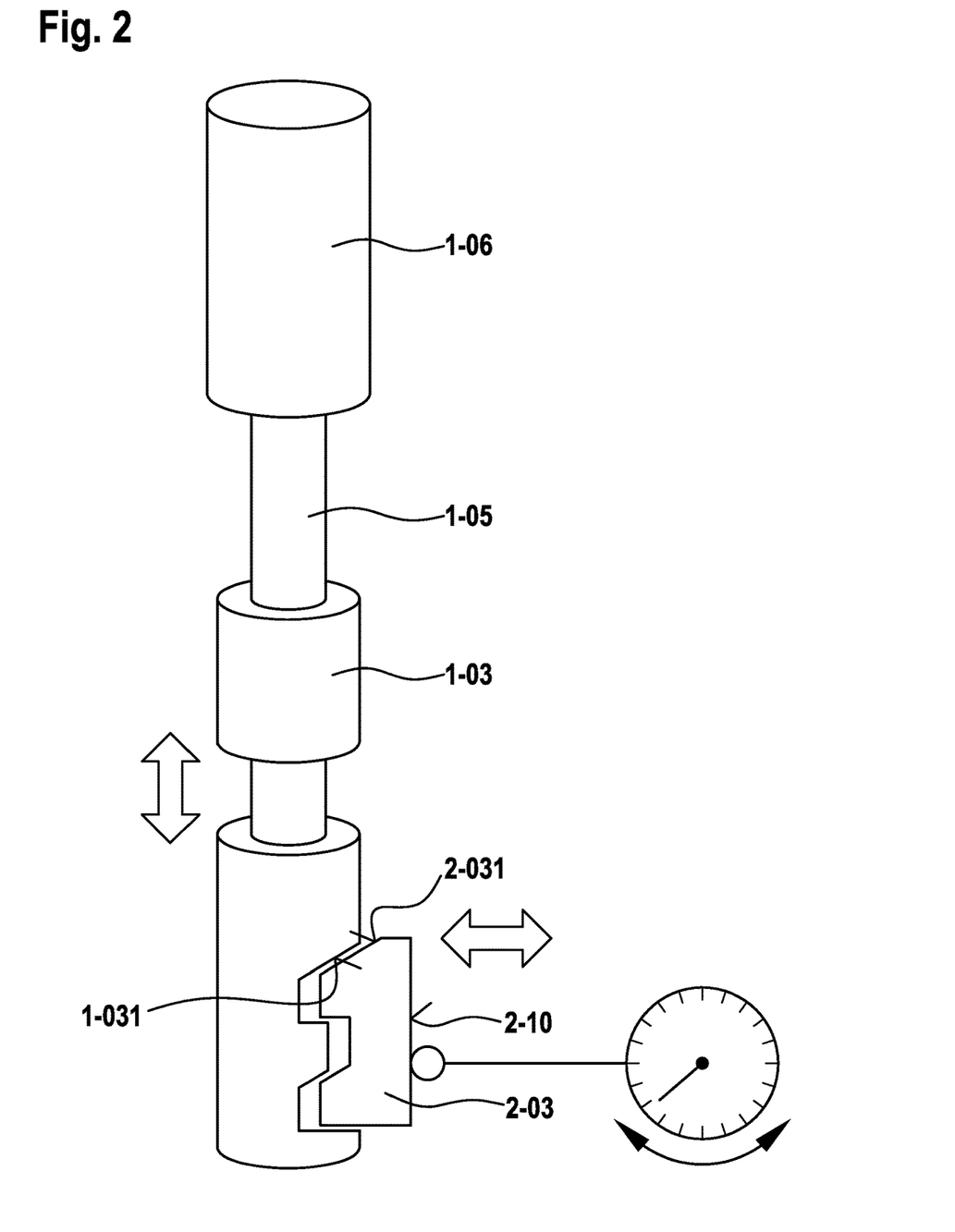
FIG. 2 illustrates the axial adjustment of the feed rod in detail.

In FIG. 2, the feeding action of the honing tool 2 is illustrated partially cut-away and somewhat schematically. Important in connection with the invention is that a relatively long tolerance chain is existing that begins at the linear drive 1-06, often embodied as a piezo actuator, and extends via the push rod 1-05, the feed rod 1-03 as well as the slantedly positioned feeding surfaces 1-031 and 2-031 up to the support strips 2-03. As a result of this, in a conventional honing tool the radial position of a contact surface 2-10 of the support strip 2-03 is subject to certain fluctuations. When it is now assumed that about the circumference four supports strips 2-03 are distributed and for each one of the support strips 2-03 the aforementioned tolerance chain is effective, then it is apparent that the radial positions of the four contact surfaces 2-10 are different.

When now onto these radially differently positioned support strips 2-03 a honing stone is mounted, then the abrasive surfaces of the honing stones (not illustrated) have radial positions that differ relative to each other and this impairs the machining result.

According to the invention, it is now provided that, either on all support strips or on the upstream feeding devices, means are present in order to compensate these tolerances by separate adjustment. It is however also sufficient when in a honing tool with n support strips 2-02 and corresponding n feeding devices only n−1 adjusting devices are present. In this case, all support strips with adjusting devices are simply adjusted to the size of the support strip without adjusting means.

Figure 3:
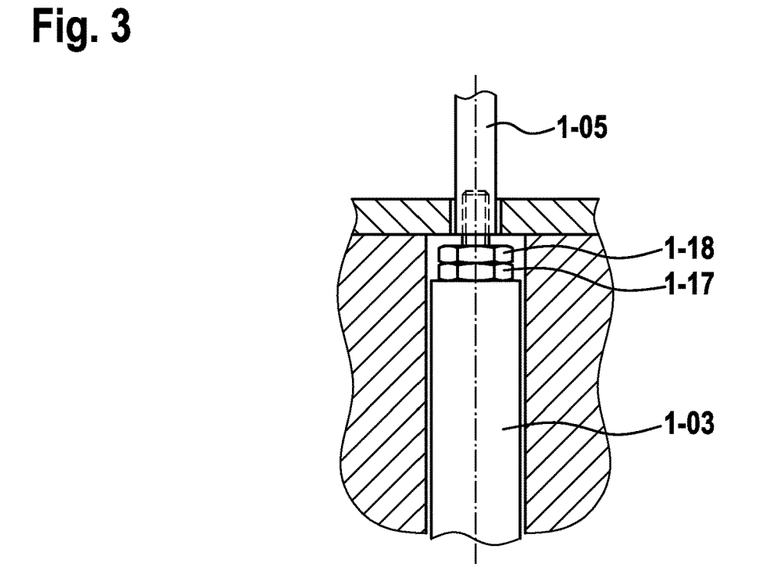
FIG. 3 illustrates the individual adjustment of the feed rod by adjusting thread and lock nut.

It is also apparent that there are various possibilities for compensating tolerances within this transmission chain, beginning at the linear drive 1-06 up to the support strip 2-03. A first variant of such means for adjusting at least one honing stone is illustrated in FIG. 3. Here, between the push rod 1-05 and the feed rod 1-03 an adjusting screw 1-17 is provided which can screwed into an inner thread in the push rod 1-05 to a greater or lesser extent. Accordingly, the spacing between the push rod 1-05 and the feed rod 1-03 can be changed/adjusted. As a result of this, the contact surface 2-10 of the downstream support strip 2-03 (not illustrated in FIG. 3) is moved into the desired radial position. As soon as this position has been reached, the adjusting screw 1-17 is secured by means of a lock nut 1-18 against rotation and the downstream support strip 2-03 is adjusted. In the corresponding manner, all further support strips of the honing tool which are provided with means for adjustment are adjusted likewise.

Figure 4:
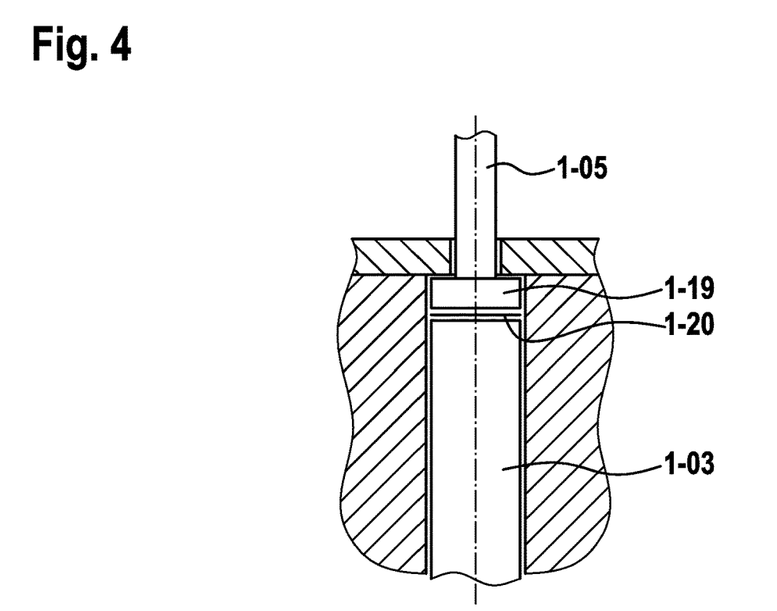
FIG. 4 shows the axial adjustment of the feed rod by adjusting disks.

In FIG. 4, an alternative embodiment is illustrated. In this embodiment, on the lower end of the push rod a ground disk 1-19 is formed. Between this ground disk 1-19 and the feed rod 1-03 an adjusting disk 1-20 is arranged whose thickness is selected such that the radial position of the downstream support strip 2-03 assumes the desired value. In this context, it is possible to make available for adjustment a set or a plurality of adjusting disks 1-20 of different thickness and to then select a suitable one and mount it.

Of course, it is also possible to provide the desired thickness by grinding the adjusting disk 1-20 to size. Alternatively, it is also possible to grind the disk 1-19 to the desired size.

As already mentioned, the aforementioned adjusting possibilities and the adjusting possibilities to be described in the following are only exemplary and provided for illustration purposes. The invention is not limited to these possibilities of adjustment.

Figure 5:
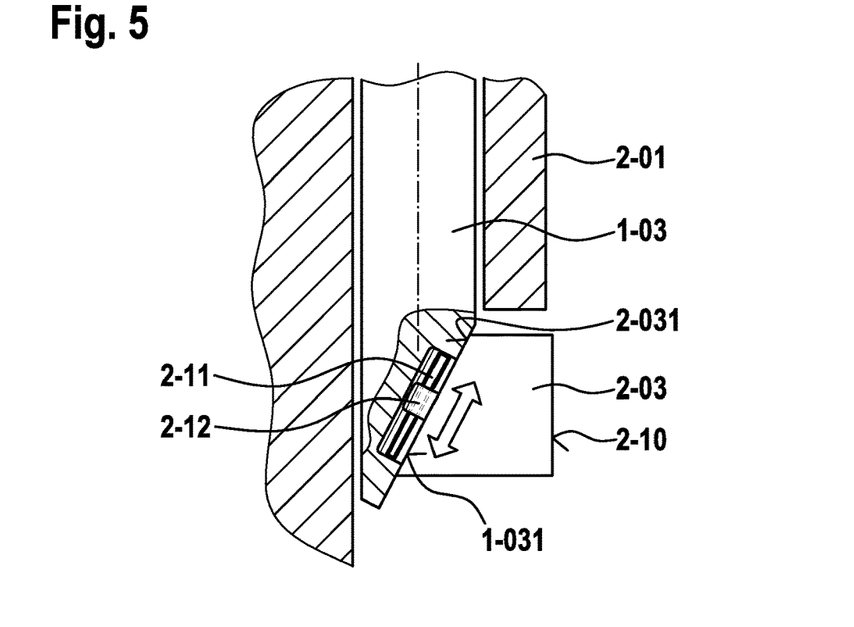
FIG. 5 shows the radial adjustment by sliding of the support strip on the feeding surface.

In FIG. 5 a further embodiment is illustrated in which the nut is designed as an eye which is part of the support strip 2-03. At the lower end of the feed rod 1-03 a threaded rod 2-11 is arranged parallel to the feeding surfaces 1-031 and 2-031 and is rotatably supported but secured in axial direction.

When now the threaded rod 2-11 is rotated, for example, by means of a socket wrench or a screwdriver, then the support strip 2-03 is moved along the feeding surfaces 2-031 and 1-031 relative to the feed rod 1-03 and, as a result of this, the contact surface 2-10 of the support strip 2-03 changes its radial position. In this way, it is also possible to adjust the radial position of the contact surface 2-10 individually.

Figure 6:
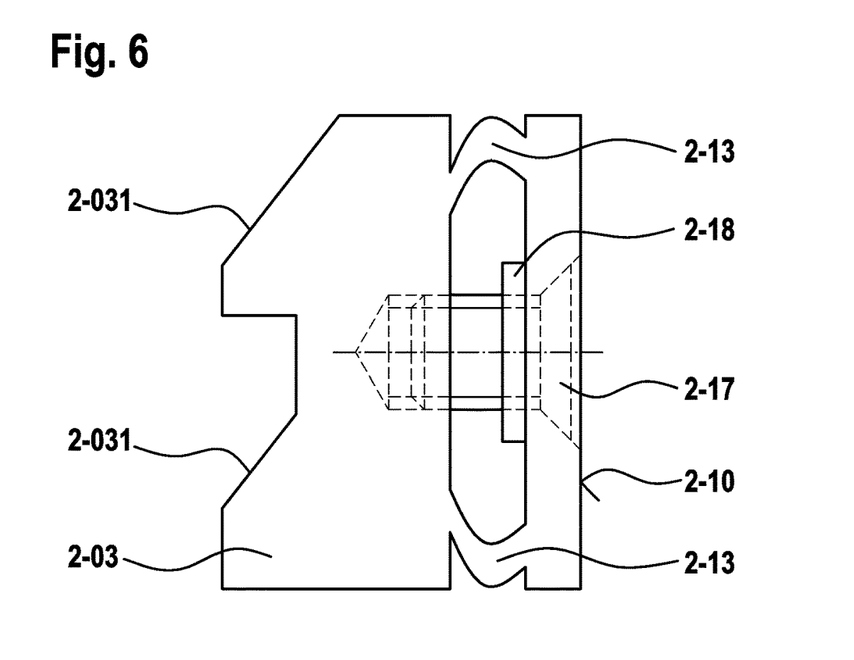
FIG. 6 shows the radial adjustment by bending joints below the receiving surface for the honing stone.

A further embodiment of means for separate adjustment of at least one honing stone is illustrated in FIG. 6. In this embodiment, the support strip 2-03 is provided with a recess or a solid body joint 2-13 between the feeding surfaces 2-031 and the contact surface 2-10. Here, an adjusting screw 2-17 with a Seeger ring 2-18 or something similar is provided also. By actuation of the adjusting screw 2-17, the contact surface 2-10 of the support strip 2-03 can be adjusted in radial direction against the radially acting spring force exerted by the solid body joint 2-13. Instead of the illustrated solid body joint 2-13, an elastic intermediate layer between the base of the support strip 2-03 and the contact surface 2-10 can also be arranged and connected by vulcanization; this elastic intermediate layer is then compressed by the adjusting screw 2-17 in radial direction to a greater or lesser extent.

Figure 7:
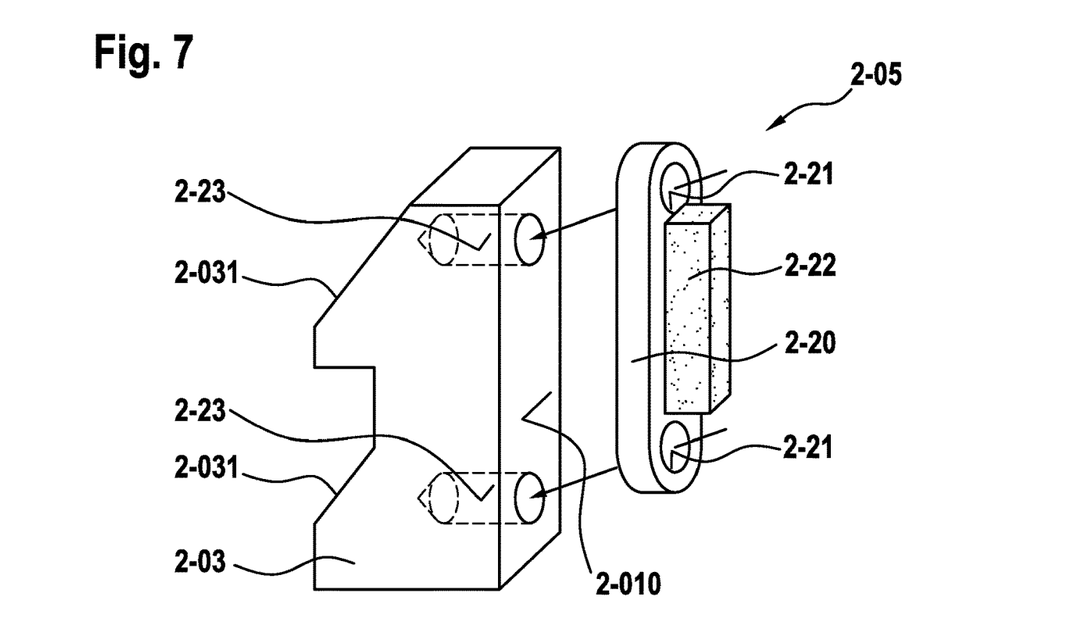
FIG. 7 shows mounting of the honing stone on the support strip.

In FIG. 7, in a greatly enlarged illustration a support strip 2-03 with feeding surfaces 2-31 and contact surface 2-10 and a honing stone 2-05 dressed according to the invention are illustrated in exploded view. The honing stone 2-05 comprises a base plate 2-20, in general made of steel, with two through bores 2-21. Between the bores 2-21, the comparatively short abrasive coating 2-22 is provided. The abrasive coating 2-22 can be sintered, glued or soldered onto the base plate 2-20. The base plate 2-20 in turn is connected with a face-ground bottom side to the receiving surface of the support strip with force fit by a screw connection or fused on by an adhesive or by soldering.

Corresponding with the through bores 2-21, two blind bores 2-23 with inner thread are provided on the support strip 2-03. In this way it is possible to screw the honing stone 2-05 by means of two screws, not illustrated, onto the support strip 2-03.

Figure 8:
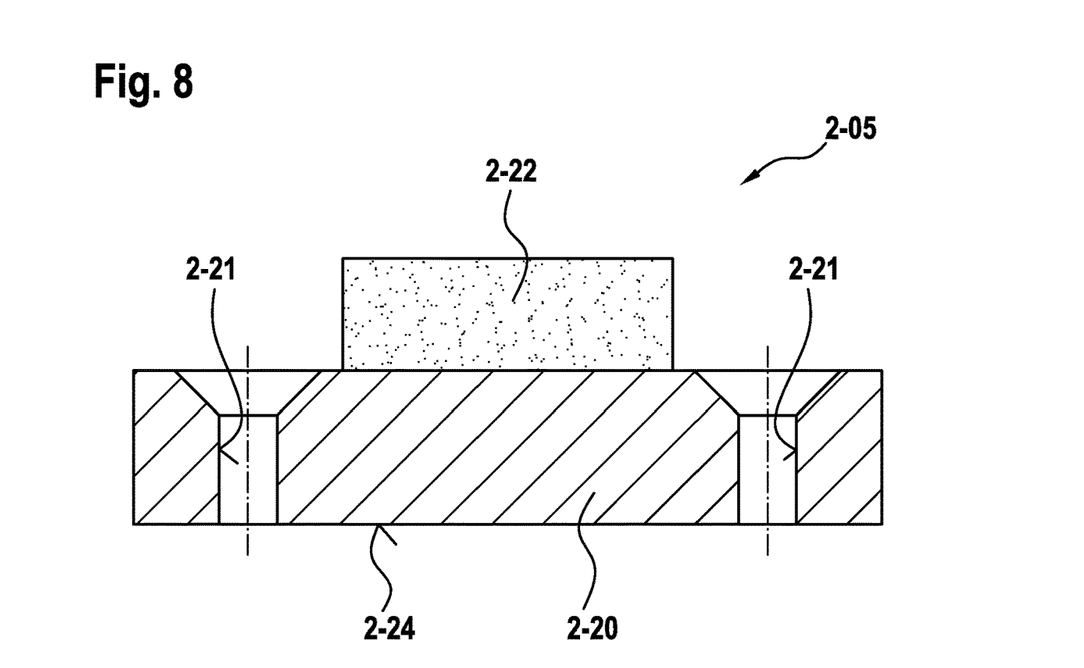
FIG. 8 shows mounting of the honing stone on the support strip by screws.

In FIG. 8, such a honing stone 2-05 according to the invention is illustrated in longitudinal section. In this context, it should be noted that a bottom side 2-24 is planar. This is achieved preferably by face-grinding.

Figure 9:
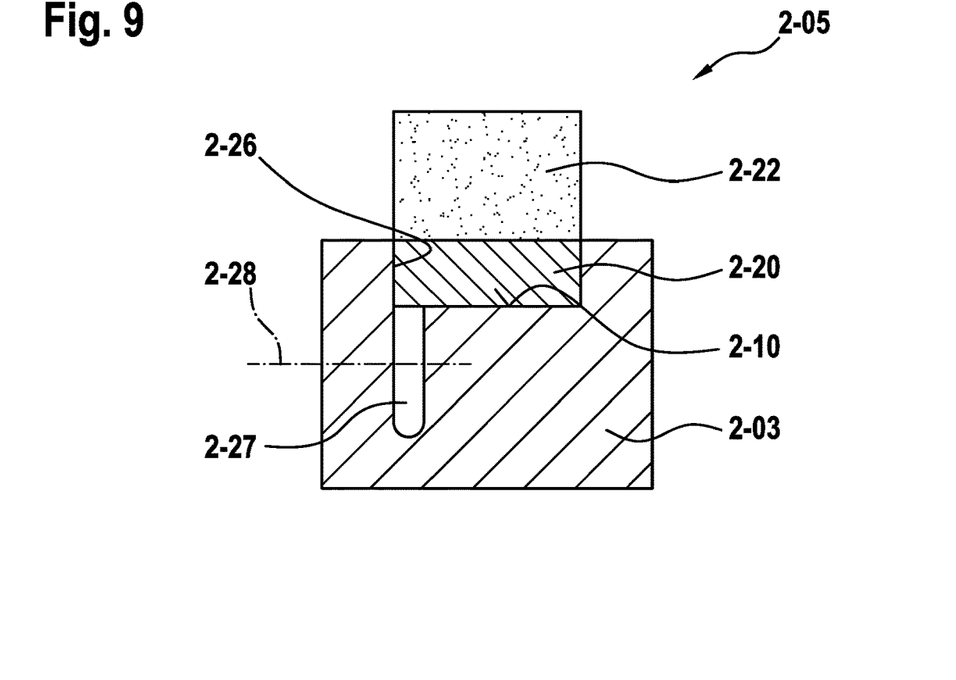
FIG. 9 shows mounting of the honing stone on the support strip by clamping.

An alternative attachment of a honing stone 2-05 on a support strip 2-03 is illustrated in FIG. 9. In this embodiment, a pocket 2-26 is machined in the support strip 2-03 whose radial inner surface represents the contact surface 2-10.

In order to be able to clamp the honing stone 2-05 in this pocket 2-26, the pocket 2-26 comprises a slot 2-27 so that one sidewall of the pocket 2-26 is somewhat flexible and can be pressed by a schematically indicated clamping screw 2-28 laterally against the base 2-20 of the honing stone 2-05. In this way, the honing stone 2-05 is secured by clamping.

Figure 10:
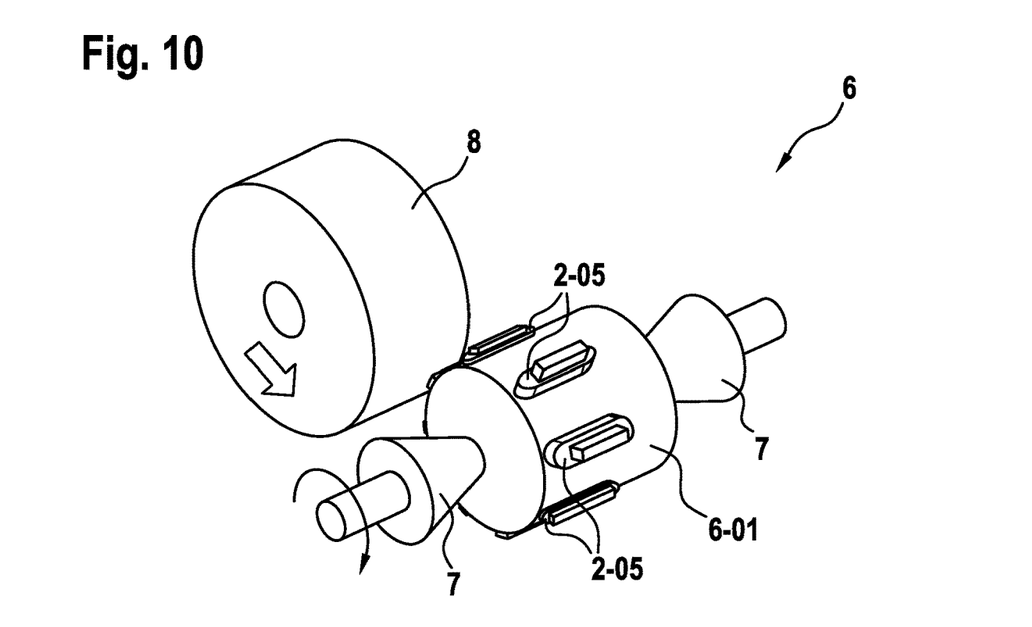
FIG. 10 shows processing of the honing stones according to the invention by grinding.
Figure 11:
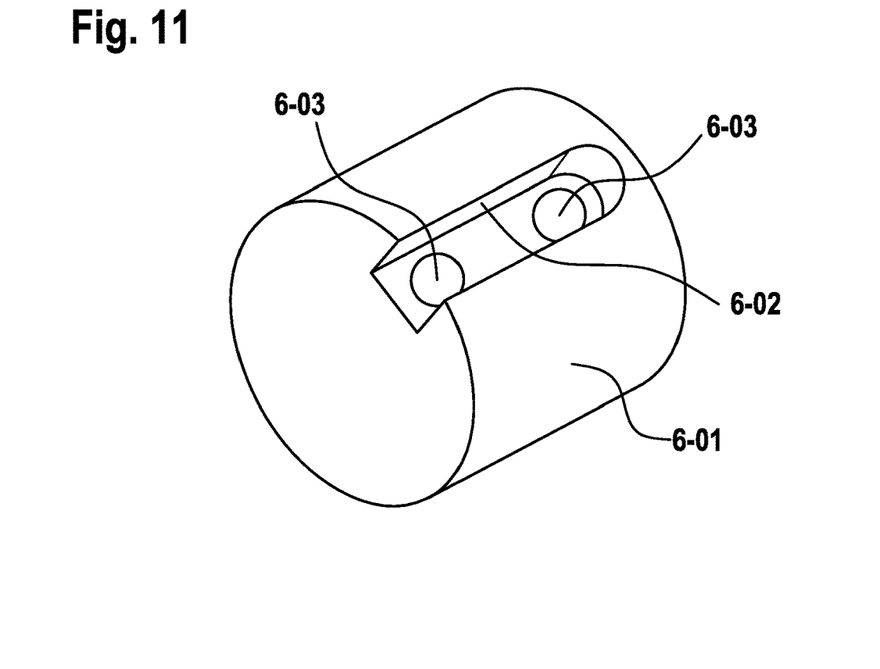
FIG. 11 is a dressing device according to the invention with flat support.
Figure 12:
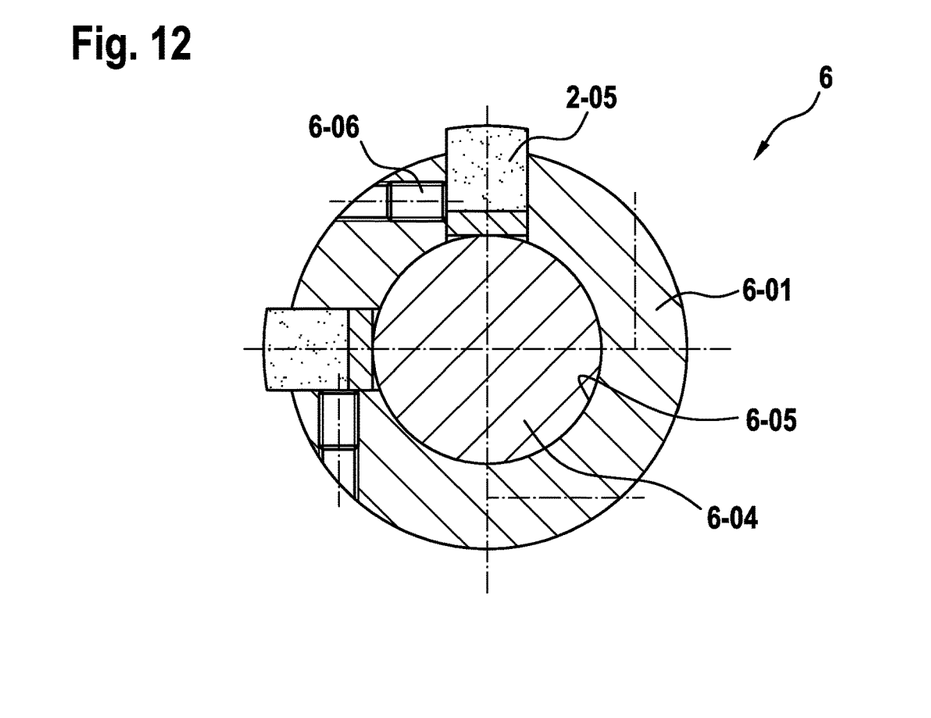
FIG. 12 shows a dressing device according to the invention with linear support.

In FIGS. 10 to 12, embodiments of dressing devices according to the invention for dressing honing stones 2-05 are shown. The dressing device according to the invention is identified by reference character 6. As can be seen in FIG. 10, the dressing device 6 has a substantially cylindrical base body 6-01 that is mounted between the centers 7 of a cylindrical grinding machine. Mounting between the centers 7 is well known to a person of skill in the art in the field of manufacturing technology and is therefore not separately explained.

In FIG. 10 a grinding wheel 8 of an outer cylindrical grinding machine is indicated. The centers 7, and with them the dressing device 6 according to the invention for dressing the honing stones 2-05, are caused to rotate (indicated by a curved arrow in FIG. 10) and this enables dressing of the honing stones 2-05 by means of the grinding wheel 8.

In order to prepare the honing stones to a ready-to-use state, the height of the honing stones 2-05, i.e., the spacing of the working surface of the abrasive coating 2-22 to the face-ground bottom side must be brought to a uniform size. At the same time, it is however required to provide the working surface of the honing stones 2-05 with the desired radius of curvature, in accordance with the working diameter of the bore to be honed. Moreover, the working surface should be straight and parallel to the face-ground bottom side.

After the honing stones 2-05 have been dressed, the dressing device 6 according to the invention is removed from the cylindrical grinding machine or the honing stones 2-05 are removed from the base body 6-01 of the dressing device 6 and, in a separate process, the abrasive surface of the honing stones 2-05 is roughened.

Attachment of the honing stones 2-05 in the base body 6-01 of the dressing device 6 is realized preferably in the same way as later on the honing stones 2-05 are attached in the honing tool (not illustrated).

In FIG. 11, an embodiment of such an attachment is shown as a detail. In the base body 6-01 in this embodiment a pocket 6-02 is formed that, for example, has been milled by an end mill cutter.

The base of the pocket 6-02 corresponds in its function approximately to the contact surface 2-10 of a honing tool 2 and has in the illustrated embodiment two bores with inner thread 6-03. By means of these inner threads 6-03 it is possible to secure the honing stone, for example, according to FIG. 8, in the pocket 6-02. It is understood that a plurality of such pockets 6-02 are distributed about the circumference and the base of these pockets 6-02 has radially exactly the same position, respectively. In this case, it is then possible to dress several honing stones in a single dressing process to the same height.

This arrangement requires a precise depth of the grooves so that the radial position of the face-ground bottom side of the honing stone for all honing stones in the dressing device is identical. This precision however depends on the precision with which the pockets 6-02 can be produced.

For higher precisions, a further dressing device has been developed; it is shown in FIG. 12 in section view and somewhat simplified. In this embodiment, the base body 6-01 is pushed onto a central mandrel 6-05 and is secured without play wherein the mandrel 6-04 is received between the centers of a cylindrical grinding machine.

It is possible with high precision and in a relatively simple way to regrind the cylindrical outer surface of the mandrel 6-04 between the centers such that a true-running error of less than $\frac{1}{100}$ mm is produced. Also, with the same precision it is possible to produce with a flat grinding machine planar contact surfaces for the honing stones 2-05 at a location where later on the pockets 2-06 are to be positioned.

Therefore, it is very advantageous when the pockets 6-02 in this embodiment are so deep that they reach a central bore 6-05 of the base body 6-01. In other words, the outer diameter (the outer wall) of the mandrel 6-04 then ensures the radial positioning of the honing stones 2-05. In order for these honing stones not to fall out of the pockets 6-02, laterally a clamping screw 6-06 can be provided. The clamping screw 6-06 is screwed into an inner thread (no reference character) in the base body 6-01 and impinges laterally on the honing stone 2-05 and secures thus the honing stone 2-05.

A further much simplified method for regrinding the honing stones 2-05, which is not illustrated, is comprised of a simple flat grinding process in which the ground bottom sides of the honing stones 2-05 are clamped onto a ground plane and then are processed by flat grinding on the working surface. The advantage of this method is the simplicity and simple handling of the height of the honing stone with high precision. A disadvantage is however that the honing stones 2-05 have no radius of curvature. The latter is machined only upon use of the honing stone 2-05 in the bore. Since locally at the edges of the abrasive coatings high surface pressure is produced, in particular for greater diameters, i.e., for greater radii of curvature, a fast shaping of the working surface on the honing stones is possible.

The specification incorporates by reference the entire disclosure of German priority document 10 2014 202 772.1 having a filing date of Feb. 14, 2014.

While specific embodiments of the invention have been shown and described in detail to illustrate the inventive principles, it will be understood that the invention may be embodied otherwise without departing from such principles.

What is claimed is:

1. A dressing device for dressing honing stones, the dressing device comprising:
   a base body comprising at least one honing stone receptacle;
   a mounting device configured to mount the dressing device in a grinding machine;
   a clamping device fixedly securing a honing stone in the at least one honing stone receptacle relative to a radial direction of the base body;
   wherein the at least one honing stone receptacle penetrates the base body in the radial direction of the base body so far that the at least one honing stone receptacle reaches a central bore of the base body.

2. The dressing device according to claim 1, wherein the at least one honing stone receptacle is a pocket.

3. The dressing device according to claim 1, wherein the mounting device comprises a cylindrical mandrel, wherein the base body is arranged with the central bore without play on the cylindrical mandrel and the cylindrical mandrel provides a radial stop defining a precise radial position of the honing stone when the honing stone is pushed against and contacts the cylindrical mandrel.

4. The dressing device according to claim 3, wherein the mandrel comprises centering bores provided at end faces of the mandrel.

5. The dressing device according to claim 3, wherein the mandrel comprises an outer wall surface that is ground or the mandrel is manufactured of hardened steel.

6. The dressing device according to claim 3, wherein the mandrel is manufactured of hardened steel and comprises an outer wall surface that is ground.

7. The dressing device according to claim 1, wherein the clamping device comprises clamping screws.

8. A honing tool comprising:
a honing tool body;
at least one honing stone;
at least one feeding means, wherein a feeding movement of the at least one feeding means is transmitted onto the at least one honing stone such that the at least one honing stone is fed radially against a bore surface to be machined;
separate adjustment means arranged between the feeding means and the at least one honing stones and configured to separately adjust the at least one honing stone;
wherein the separate adjustment means comprises an adjusting screw or a threaded pin.

9. The honing tool according to claim 8, wherein the separate adjustment means comprises a lock nut.

10. The honing tool according to claim 8, wherein the feeding means comprises a push rod and a feed rod, wherein the push rod is acting on the feed rod and the feed rod is acting on the at least one honing stone, wherein the adjusting screw or the threaded pin is arranged between the push rod and the feed rod.

11. The honing tool according to claim 8, wherein the feeding means comprises a feed rod and a support strip on which the at least one honing stone is mounted, wherein the feed rod acts on the support strip, wherein the adjusting screw or the threaded pin is arranged between the feed rod and the support strip.

12. The honing tool according to claim 11, wherein the adjusting screw or the threaded pin is integrated into the support strip.

13. A honing tool comprising:
a honing tool body;
at least one honing stone;
at least one feeding means, wherein a feeding movement of the at least one feeding means is transmitted onto the at least one honing stone such that the at least one honing stone is fed radially against a bore surface to be machined;
separate adjustment means arranged between the feeding means and the at least one honing stones and configured to separately adjust the at least one honing stone;
wherein the separate adjustment means comprises an adjusting disk;
wherein the feeding means comprises a push rod and a feed rod, wherein the push rod is acting on the feed rod and the feed rod is acting on the at least one honing stone, wherein the adjusting disk is arranged between the push rod and the feed rod.

14. A method for dressing at least one honing stone by using a dressing device comprising a base body and a mounting device configured to mount the dressing device in a grinding machine, wherein the base body comprises at least one honing stone receptacle, the method comprising:
inserting at least one honing stone in a honing stone receptacle of the dressing device, wherein the at least one honing stone receptacle is a pocket, and fixedly securing the at least one honing stone relative to a radial direction in the pocket; and
dressing an abrasive coating of the at least one honing stone by grinding, wherein grinding is carried out by outer cylindrical grinding.

15. The method according to claim 14, further comprising selecting a number of honing stones to be dressed in a single mounting action on the dressing device to match the number of honing stones accommodated in a honing tool.

16. The method according to claim 14, further comprising roughening an abrasive surface of the abrasive coating after dressing.

17. The method according to claim 14, further comprising:
arranging the base body with a central bore without play on a cylindrical mandrel of the mounting device;
in the step of inserting, pushing the honing stone into contact at the cylindrical mandrel so that the cylindrical mandrel provides a radial stop for the honing stone and defines a precise radial position of the honing stone.

\* \* \* \* \*